United States Patent [19]
Acker

[11] 3,844,616

[45] Oct. 29, 1974

[54] DUMP TRUCK HAVING AN OPEN SHELL IN THE SHAPE OF ONE-HALF OF AN ELLIPSE

[76] Inventor: Douglas B. Acker, 655 Eastwood Way, San Francisco, Calif. 94941

[22] Filed: July 16, 1973

[21] Appl. No.: 379,783

[52] U.S. Cl................ 298/10, 298/22 D, 296/28 D
[51] Int. Cl............................................. B65g 67/50
[58] Field of Search....... 296/10, 31 R, 28 D, 28 M; 298/10, 8, 22 D, 17 R

[56] References Cited
UNITED STATES PATENTS

| | | | |
|---|---|---|---|
| 2,490,532 | 12/1949 | Maxon, Jr................. | 296/28 D |
| 3,093,254 | 6/1963 | Sammarco................. | 296/15 X |
| 3,594,042 | 7/1971 | Gauch...................... | 298/22 D |

*Primary Examiner*—Allen N. Knowles
*Attorney, Agent, or Firm*—Gerald L. Moore

[57] ABSTRACT

A dump truck having an elongated open shell with a cross-section that is approximately the shape of one-half of an ellipse. Said shell is provided with a top rail of polygonal shape turned with the apex uppermost so that no material lodges thereon during the loading. The open shell is provided with an arcuate bottom and arcuate side walls with the radius of curvature of the arcuate bottom being about three times the radius of curvature of each of the arcuate side walls.

3 Claims, 4 Drawing Figures

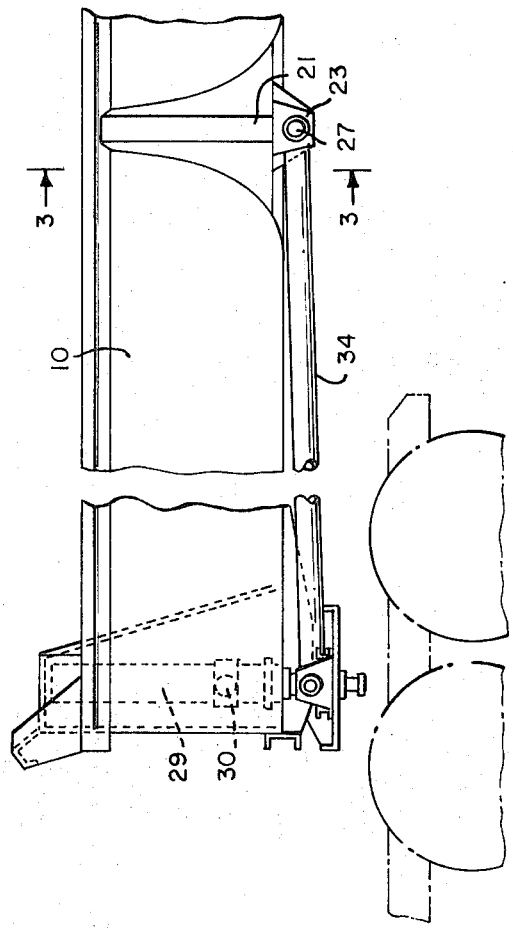
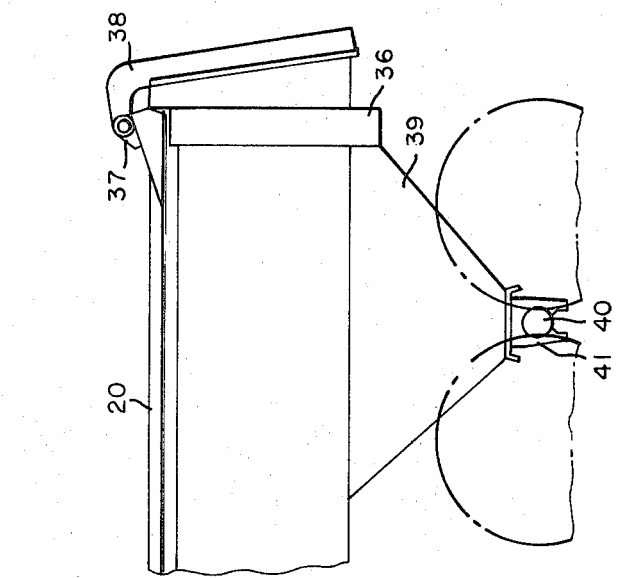
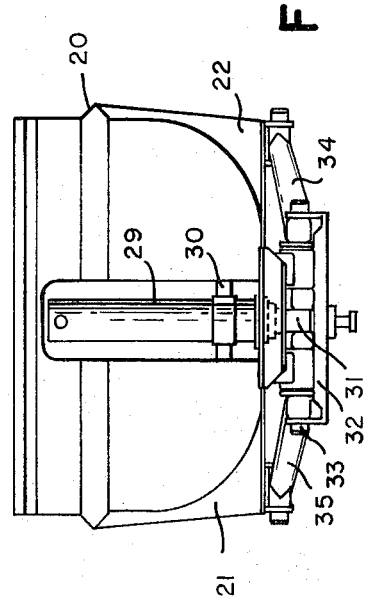

PATENTED OCT 29 1974　　　　SHEET 2 OF 2　　　　3,844,616

DUMP TRUCK HAVING AN OPEN SHELL IN THE SHAPE OF ONE-HALF OF AN ELLIPSE

DESCRIPTION OF THE INVENTION

This invention relates to dump trucks of the type constructed to haul dry bulk material such as rock, broken cement, sand, gravel and the like.

An object of this invention is to provide an improved dump truck with an elongated open shell having a cross-section that is approximately the shape of one-half of an ellipse constructed so that it is especially adapted to haul dry bulk material such as rock, broken cement, sand, gravel and the like.

Another object of this invention is to provide an improved dump truck with an elongated open shell having a cross-section that is approximately the shape of one-half of an ellipse constructed so that it is not necessary to use stiffeners and bolsters.

Another object of this invention is to provide an improved dump truck in which the open shell has a cross-section shape that is approximately that of one-half of an ellipse and is in the form to give good impact resistance without requiring the use of transverse stiffening so that washboarding effect is eliminated in said shell even though the dump truck is used for hauling rock, broken cement and the like.

Still another object of this invention is to provide an improved dump truck with a shell having the shape of one-half of an ellipse which is capable of hauling large rocks without jamming against the sides particularly when the load is being dumped and also providing for good speading of the load material when such material is in the form of gravel, sand or asphalt which is to be placed on a road during the dumping thereof.

A further object of this invention is to provide an improved dump dtruck with an open shell having a cross-sectional shape that approximates one-half of an ellipse, said shell being provided with a square or rectangular tubular top rail that is turned so that one corner is uppermost whereby the top rail gives excellent resistance to outward bending of the sides of the shell and also prevents sand, gravel or asphalt from being lodged on the top of the tubing during loading of the dump truck so that accidental spreading of this material during hauling on the highway is prevented.

Other and further objects of this invention will be apparent to those skilled in the art to which it relates from the following specification, claims and drawing.

In accordance with this invention, there is provided a dump truck structure that may be efficiently and economically manufactured and which is rugged when used for hauling dry material such as rock, broken cement, sand, gravel and asphalt mixtures and the like. The body of this dump truck is in the form of an elongated open shell having a cross-section that is approximately the shape of one-half of an ellipse. This shell is provided with arcuate side walls and an arcuate bottom and the radius of curvature of the arcuate bottom is about three times the radius of curvature of each of the arcuate side walls. This structure provides a shell with a continuous curve that gives very good impact resistance when the dump truck is used for hauling material such as rocks and broken cement. Furthermore, this continuous curve structure requires no transverse stiffening such as bolsters and the like and the washboarding effect which may be found in truck bodies provided with bolsters is eliminated. Thus, the washboarding which impedes the load flow during dumping is also eliminated and any abrasion which might occur at the points of stiffening is not encountered in this improved construction. This structure also has the advantage in that the load will have a lower center of gravity than a semi-circular shape carrying the same load.

Further details and features of this invention will be set forth in the following specification, claims and drawing in which briefly:

FIG. 1 is a side view illustrating an embodiment of this invention in which the wheels of the dump truck are shown in broken outline;

FIG. 2 is a front view of the dump truck shell;

Figure 3:
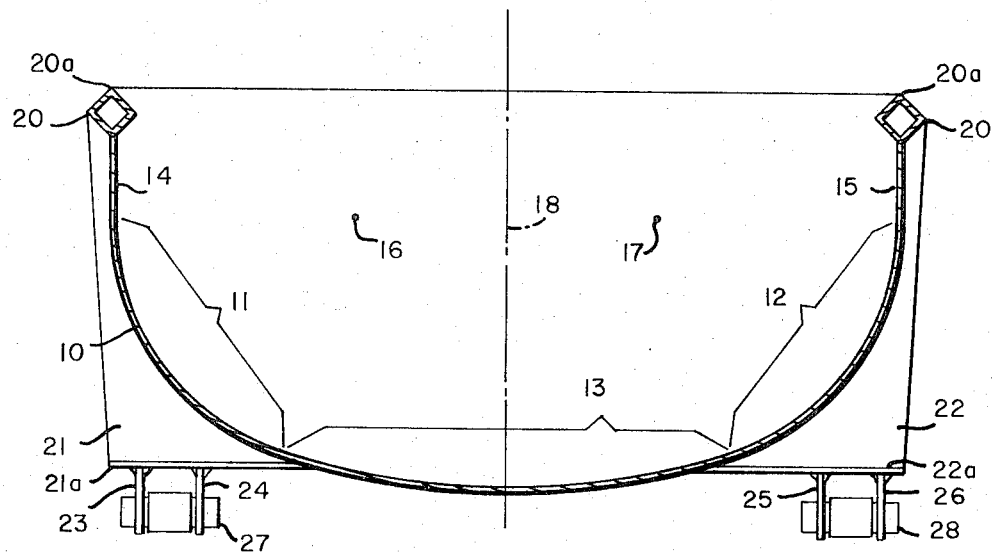
FIG. 3 is a sectional view of the shell taken along the line 3—3 of FIG. 1.
Figure 4:
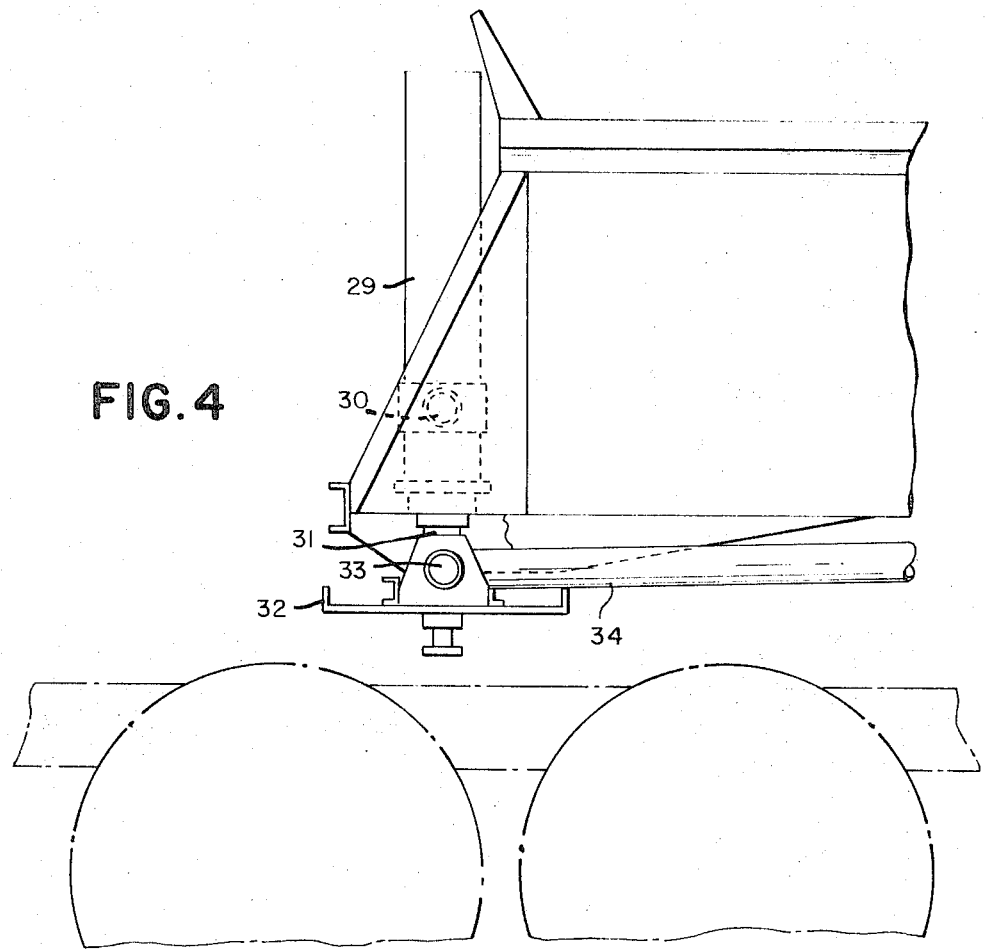
FIG. 4 is a fragmentary view of the front of the truck shell showing another form of shell lift used for dumping.

Referring to the drawing in detail reference numeral 10 designates the shell of the dump truck which is of the shape of half an ellipse as shown in detail in sectional view FIG. 3. This shell is made of sheet metal and is is provided with three arcuate sections 11, 12 and 13 and two substantially straight or vertical side sections 14 and 15 which are joined to the upper edges of the arcuate sections 11 and 12, respectively. The center of cruvature of the arcuate portion 11 is taken at the point 16 and the center of curvature of the arcuate portion 12 is taken at the center 17. The center of curvature of the bottom portion 13 is taken along the centerline 18 and this radius is approximately three times the length of the radius of curvature of the arcuate sections 11 and 12.

The top and front of the shell 10 are provided with a top rail 20 that is either of a square or rectangular cross-section and is turned so that the corner 20a is on the top. In this way the tubing provides excellent resistance to outward bending and it also presents no surface for material to lodge on during loading so that such material may later fall off on the highway during hauling of of load. Side bolsters 21 and 22 are attached to the opposite sides of the shell 10 by welding or the like. The side bolsters 21 and 22 extend downwardly and terminate in plates 21a and 22a, respectively. Upright members 23 and 24 are attached by welding or the like to the bottom of plate 21a and upright members 25 and 26 are attached by welding or the like to the bottom of plate 22a. Upright members 23 and 24 form bearings for the rod 27 and upright members 25 and 26 form bearings for the rod 28.

A hydraulic cylinder 29 which is used for elevating the front end of the shell is pivotally attached to the shell at 30. Piston rod 31 which is provided to the hydraulic cylinder 29 is pivotally attached to the member 32 by the rod 33 which serves as a bearing therefor and which also serves as a support for the front of the shell when said shell is in its horizontal position. The front ends of the members 34 and 35 are also pivotally attached to the member 32 by the rod 33 and the rear ends of these members are attached to the rods 27 and 28, respectively, substantially at the center of the shell. Thus, when hydraulic pressure or the like is supplied into the upper end of the hydraulic cylinder 29 from a suitable source of fluid pressure (not shown), during the dumping of the load, the front end of the dump truck shell 10 is raised and at the same time the rear ends of the members 34 and 35 swing upwardly with the central part of the shell.

A frame member 36 is attached to the rear part of the shell on the outside thereof by welding or the like and at the upper part of this frame member there is attached a bearing member 37 for supporting the door 38 which is used to close the rear end of the shell. A pair of members such as the member 39 shown in FIG. 1 is attached by welding or the like to the bottom of the shell to provide support for the rear part of the shell. A rear wheel mounting (not shown) which is of conventional construction is attached to the shaft 40 which is pivotally supported on the bottom of the pair of members 39 by the bearing 41. Both the front and the rear of the shell are supported on wheels by conventional mountings and the wheels on one side of the dump truck are shown in broken outline in FIG. 1 of the drawing.

While I have shown and described a preferred from of the invention, it will be apparent that the invention is capable of variation and modification from the form shown so that the scope thereof sould be limited only by the proper scope of the claims appended hereto.

What I claim is:

1. In a dump truck the combination comprising a body having an elongated open shell with a cross section that is approximately the shape of one-half of an ellipse, the upper parts of the long sides of said shell comprising narrow substantially straight walls, a front wall having the shape of one-half of an ellipse welded to the front of said open shell, a top rail of polygonal shape having a bottom portion thereof welded to the top edges of said front wall and said sides, said top rail being turned so that one corner thereof is uppermost to prevent small pieces of rock from resting thereon, a door at the rear of said shell, hinge means attaching said door to said shell, a plurality of wheels and means supporting said shell, a plurality of wheels and means supporting said body on said wheels.

2. In a dump truck the combination of a body having an elongated open shell with a cross section that is approximately the shape of one-half of an ellipse, said shell comprising arcuate side walls and an arcuate bottom, the radius of curvature of said arcuate bottom being about three times the radius of curvature of each of said arcuate side walls, a front wall having the shape substantially of one-half of an ellipse welded to the front of said open shell, a top rail of polygonal shape having the bottom portion thereof welded to the top of said shell, a door at the rear of said shell, hinge means attaching said door to said shell, a plurality of wheels and means supporting said body on said wheels.

3. In a dump truck the combination as set forth in claim 2, further comprising side bolsters fixedly attached to said arcuate side walls on the outsides thereof, plates attached to the bottoms of said bolsters, a pair of rods, bearing means for the rear ends of said rods, means attaching said bearing means to said plates, hydraulic cylinder means attached to the front of said shell for lifting said front during the load dumping operation, said hydraulic cylinder means having a piston rod and means pivotally attaching said piston rod to the front ends of said pair of rods.

* * * * *